US012602852B2

(12) United States Patent
Fang et al.

(10) Patent No.: US 12,602,852 B2
(45) Date of Patent: Apr. 14, 2026

(54) DYNAMIC GRAPHIC EDITING METHOD AND DEVICE

(71) Applicant: Beijing Zitiao Network Technology Co., Ltd., Beijing (CN)

(72) Inventors: Cheng Fang, Beijing (CN); Chenxiang Zhao, Beijing (CN); Chenglin Zhou, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 181 days.

(21) Appl. No.: 18/551,675

(22) PCT Filed: Mar. 22, 2022

(86) PCT No.: PCT/CN2022/082206
§ 371 (c)(1),
(2) Date: Sep. 21, 2023

(87) PCT Pub. No.: WO2022/213802
PCT Pub. Date: Oct. 13, 2022

(65) Prior Publication Data
US 2024/0177384 A1 May 30, 2024

(30) Foreign Application Priority Data
Apr. 7, 2021 (CN) .......................... 202110372548.9

(51) Int. Cl.
*G06T 11/60* (2006.01)

(52) U.S. Cl.
CPC .................................... *G06T 11/60* (2013.01)

(58) Field of Classification Search
CPC .................................... G06T 11/60; G06F 8/34
See application file for complete search history.

(56) References Cited

U.S. PATENT DOCUMENTS 8,924,435 B1 * 12/2014 Wen .................... H04L 12/6418
707/809
2003/0080966 A1 5/2003 Blaho
(Continued)

FOREIGN PATENT DOCUMENTS

CN 103699379 A 4/2014
CN 105224319 A 1/2016
(Continued)

OTHER PUBLICATIONS

International Search Report issued Jun. 1, 2022 in International Application No. PCT/CN2022/082206, with English translation (7 pages).

(Continued)

*Primary Examiner* — Terrell M Robinson

(57) ABSTRACT

The embodiments of the present application propose dynamic graphic editing method and device, and relate to the technical field of image processing. The method comprises: creating a preview scene which is the same as an editing scene of an editing instance, receiving an editing command sent by the editing instance which instructs the preview instance to perform a target editing operation on the preview scene, and wherein the target editing operation comprises an editing operation performed by the editing instance on the editing scene, performing the target editing operation on the preview scene based on the editing command, and outputting a preview image of the dynamic graphic based on the preview scene on which the target editing operation has been performed and dynamic content of the dynamic graphic.

19 Claims, 5 Drawing Sheets

(56)        References Cited

U.S. PATENT DOCUMENTS

| 2011/0055427 A1* | 3/2011 | Das ......................... H04L 67/06 |
| | | 709/247 |
| 2011/0320964 A1 | 12/2011 | Gambhir et al. |
| 2013/0039433 A1* | 2/2013 | Ralston ................ G11B 27/034 |
| | | 375/240.26 |
| 2013/0086478 A1* | 4/2013 | Gibby .................... G11B 27/34 |
| | | 715/738 |
| 2014/0325349 A1 | 10/2014 | Riherd et al. |
| 2021/0133388 A1* | 5/2021 | Wang ................. G06F 16/9574 |
| 2022/0116746 A1 | 4/2022 | Ma et al. |

FOREIGN PATENT DOCUMENTS

| CN | 106331869 | A | | 1/2017 | |
| CN | 106817538 | A | | 6/2017 | |
| CN | 107728782 | A | | 2/2018 | |
| CN | 109740096 | A | * | 5/2019 | |
| CN | 110324413 | A | | 10/2019 | |
| CN | 111494957 | A | * | 8/2020 | ............. A63F 13/60 |
| CN | 111679826 | A | | 9/2020 | |
| CN | 111897615 | A | | 11/2020 | |
| CN | 112154438 | A | | 12/2020 | |
| IN | 202047051520 | A | | 4/2020 | |

OTHER PUBLICATIONS

Written Opinion for International Application No. PCT/CN2022/082206, mailed Jun. 1, 2022, 6 Pages.
Office action received from Chinese patent application No. 202110372548.9 mailed on Apr. 11, 2025, 20 pages (10 pages English Translation and 10 pages Original Copy).

* cited by examiner

500

600

700

DYNAMIC GRAPHIC EDITING METHOD AND DEVICE

CROSS-REFERENCE OF RELATED APPLICATION

The present disclosure claims the priority of a Chinese patent application No. 202110372548.9 filed on Apr. 7, 2021, which is hereby incorporated by reference in its entirety.

FIELD OF THE INVENTION

The present disclosure relates to the technical field of image processing, in particular to a dynamic graphic editing method and device.

BACKGROUND

When dynamic graphics including dynamic content such as game interfaces and special effects, etc., are edited, there is a need to view the display effect after editing in real time. In response to this need, the solution proposed in the prior art is: the design editing instance and the preview instance are the same instance, the file edited in the editing window and the file displayed in the preview window are the same file, and the user can view the display effect after editing in real time through the content presented in the preview window. When the editing instance and the preview instance are the same instance, since the preview instance needs to present the display effect, it is necessary to run the dynamic content on the only instance. However, if the user enters the save operation during the running of the dynamic content, the scene file of the dynamic graphic would be saved as an intermediate process of dynamic content, and thereby, the scene file of dynamic graphic would be modified by mistake. For example: for a dynamic graphic, the position coordinate of the object A in the scene file is (0, 0), and the dynamic content is used to control the position coordinate of the object A to change with time. If when the position coordinate of object A changes to (1, 1) due to the dynamic content running, the user enters the save operation, the scene file of the dynamic graphic would be saved as (1, 1), and the position coordinate of object A in the scene file would be saved as an intermediate process of dynamic content, the scene file of the dynamic graphic would be modified by mistake.

DISCLOSURE OF THE INVENTION

In view of this, the present disclosure provides a dynamic graphic editing method and device, which can prevent the scene files of dynamic graphics from being saved as the middle process of dynamic content so as to be modified by mistake, while the display effect of the edited dynamic graphics can be viewed in real time.

In order to achieve the above purpose, the embodiments of the present disclosure provide technical solutions as follows:

In a first aspect, an embodiment of the present disclosure provides a dynamic graphic editing method, which is applied to a preview instance, and the method includes:

creating a preview scene which is the same as an editing scene of an editing instance, receiving an editing command sent by the editing instance which instructs the preview instance to perform a target editing operation on the preview scene, and wherein the target editing operation includes an editing operation performed by the editing instance on the editing scene, performing the target editing operation on the preview scene based on the editing command, and outputting a preview image of the dynamic graphic based on the preview scene on which the target editing operation has been performed and dynamic content of the dynamic graphic.

As an optional implementation of the embodiment of the present disclosure, the creating a preview scene includes:

sending first request information to the editing instance;

receiving object information sent by the editing instance, the object information including each object in the editing scene, each attribute of each object, and an attribute value of each attribute;

creating the preview scene based on the object information.

As an optional implementation of the embodiment of the present disclosure, the target editing operation includes an operation of modifying a target attribute value of the target object to a first attribute value, The editing command includes: a first identifier for identifying the target object, a second identifier for identifying the target attribute, and the first attribute value.

As an optional implementation of the embodiment of the present disclosure, the first identifier is a globally unique identifier GUID of the target object.

As an optional implementation of the embodiment of the present disclosure, the preview scene of the preview instance includes at least one object, each object includes a globally unique identifier GUID, and is mapped to a corresponding object in the editing scene through the GUID.

As an optional implementation of the embodiment of the present disclosure, the target editing operation includes an operation of modifying a target attribute value of the target object to a first attribute value;

The editing command includes: a first identifier of the target object, a second identifier for identifying the target attribute, and a first attribute value.

As an optional implementation of the embodiment of the present disclosure, the receiving the editing command sent by the editing instance includes:

receiving edit data sent by the editing instance, where the edit data includes data obtained by serializing the editing command;

deserializing the edit data to obtain the editing command.

As an optional implementation of the embodiment of the present disclosure, the receiving the edit data sent by the editing instance includes:

receiving the edit data sent by the editing instance via a socket interface.

As an optional implementation of the embodiment of the present disclosure, after performing the target editing operation on the preview scene based on the editing command, the method further includes:

sending a preview image of the dynamic graphic to the editing instance.

As an optional implementation of the embodiment of the present disclosure, the method further includes:

sending second request information to the editing instance, where the second request information carries an identifier of the target dynamic graphic;

receiving response information sent by the editing instance, the response information including a scene file of the target dynamic graphic and the dynamic content of the target dynamic graphic, and outputting the preview image of the target dynamic graphic based on the scene file of the target dynamic graphic and the dynamic content of the target dynamic graphic.

In a second aspect, an embodiment of the present disclosure provides a dynamic graphic editing method, which is applied to an editing instance, and the method includes:

performing a target editing operations on the editing scene;

sending an editing command to a preview instance according to the target editing operation, wherein the editing command is used to instruct the preview instance to perform the target editing operation on a preview scene of the preview instance.

As an optional implementation of the embodiment of the present disclosure, the method further includes:

before sending the editing command to the preview instance, receiving first request information sent by the preview instance, sending object information to the preview instance according to the first request information, the object information including each object in the editing scene, each attribute of each object, and an attribute value of each attribute.

As an optional implementation of the embodiment of the present disclosure, the editing scene of the editing instance includes at least one object, each object includes a globally unique identifier GUID, and is mapped to a corresponding object in the editing scene through the GUID.

As an optional implementation of this embodiment of the present disclosure, after performing the target editing operation on the editing scene, the method further includes:

performing a save operation on the editing scene, in response to the save operation, saving the editing scene on which the target editing operation has been performed as a scene file of the dynamic graphic.

As an optional implementation of the embodiment of the present disclosure, the method further includes:

receiving a preview image of the dynamic graphic from the preview instance, wherein the preview image is generated based on the preview scene on which the target editing operation has been performed and the dynamic content of the dynamic graphic, and outputting the preview image of the dynamic graphic.

As an optional implementation of the embodiment of the present disclosure, the method further includes:

receiving second request information sent by the preview instance, the second request information carrying an identifier of the target dynamic graphic;

sending response information to the editing instance according to the second request information, the response information including a scene file of the target dynamic graphic and the dynamic content of the target dynamic graphic.

In a third aspect, an embodiment of the present disclosure provides a dynamic graphic editing method, including:

creating a preview scene of a preview instance which is the same as an editing scene of an editing instance;

performing a target editing operation on the editing scene of the editing instance;

sending an editing command to the preview instance according to the target editing operation, where the editing command is used to instruct the preview instance to perform the target editing operation on the preview scene of the preview instance;

performing the target editing operation on the preview scene of the preview instance;

running dynamic content of the dynamic graphic in the preview scene on which the target editing operation has been performed, so that the editing instance outputs a preview image of the dynamic graphic.

In a fourth aspect, an embodiment of the present disclosure provides a dynamic graphic editing device on which a preview instance runs, and the device includes:

a creation unit configured to create a preview scene which is the same as an editing scene of an editing instance, a communication unit configured to receive an editing command sent by the editing instance which instructs the preview instance to perform a target editing operation on the preview scene, and wherein the target editing operation includes an editing operation performed by the editing instance on the editing scene, an editing unit configured to perform the target editing operation on the preview scene based on the editing command, and a preview unit configured to output a preview image of the dynamic graphic based on the preview scene on which the target editing operation has been performed and the dynamic graphic.

As an optional implementation of the embodiment of the present disclosure, the creation unit is configured to send first request information to the editing instance, receive object information sent by the editing instance, the object information including each object in the editing scene, each attribute of each object, and an attribute value of each attribute, and create the preview scene based on the object information.

As an optional implementation of the embodiment of the present disclosure, the preview scene of the preview instance includes at least one object, each object includes a globally unique identifier GUID, and is mapped to a corresponding object in the editing scene through the GUID.

As an optional implementation of the embodiment of the present disclosure, the target editing operation includes an operation of modifying a target attribute value of the target object to a first attribute value, The editing command includes: a first identifier of the target object, a second identifier for identifying the target attribute, and the first attribute value.

As an optional implementation of the embodiment of the present disclosure, the communication unit is configured to receive edit data sent by the editing instance, where the edit data includes data obtained by serializing the editing command, deserialize the edit data to obtain the editing command.

As an optional implementation of the embodiment of the present disclosure, the communication unit is configured to receive the edit data sent by the editing instance via a socket interface.

As an optional implementation of the embodiment of the present disclosure, the communication unit is configured to, after the target editing operation is performed on the preview scene based on the editing command, send a preview image of the dynamic graphic to the editing instance.

As an optional implementation of the embodiment of the present disclosure, the communication unit is further configured to send second request information to the editing instance, where the second request information carries an identifier of the target dynamic graphic, receive response information sent by the editing instance, the response information including a scene file of the target dynamic graphic and the dynamic content of the target dynamic graphic, the preview unit is further configured to output the preview image of the target dynamic graphic based on the scene file of the target dynamic graphic and the dynamic content of the target dynamic graphic.

In a fifth aspect, an embodiment of the present disclosure provides a dynamic graphic editing device on which an editing instance runs, and the device includes: an editing unit configured to perform a target editing operation on an editing scene;

a communication unit configured to send an editing command to a preview instance according to the target editing operation, wherein the editing command is used to instruct the preview instance to perform the target editing operation on a preview scene of the preview instance.

As an optional implementation of the embodiment of the present disclosure, the communication unit is further configured to, before sending the editing command to the preview instance, receive first request information sent by the preview instance, send object information to the preview instance according to the first request information, wherein, the object information including each object in the editing scene, each attribute of each object, and an attribute value of each attribute.

As an optional implementation of the embodiment of the present disclosure, the editing scene of the editing instance includes at least one object, each object includes a globally unique identifier GUID, and is mapped to a corresponding object in the editing scene through the GUID.

As an optional implementation of this embodiment of the present disclosure, the editing unit is further configured to, after performing the target editing operation on the editing scene, perform a save operation on the editing scene, and in response to the save operation, save the editing scene on which the target editing operation has been performed as a scene file of the dynamic graphic.

As an optional implementation of the embodiment of the present disclosure, the communication unit is further configured to receive a preview image of the dynamic graphic sent from the preview instance, output the preview image of the dynamic graphic, wherein the preview image is generated based on the preview scene on which the target editing operation has been performed and the dynamic content of the dynamic graphic.

As an optional implementation of the embodiment of the present disclosure, the communication unit is further configured to receive second request information sent by the preview instance, the second request information carrying an identifier of the target dynamic graphic, and send response information to the editing instance according to the second request information, the response information including a scene file of the target dynamic graphic and the dynamic content of the target dynamic graphic.

In a sixth aspect, an embodiment of the invention provides a dynamic graphic editing device on which a preview instance runs, and the device includes:

a creation unit configured to create a preview scene of the preview instance which is the same as an editing scene of an editing instance;

a first editing unit configured to perform a target editing operation on the editing scene of the editing instance;

a communication unit configured to send an editing command to the preview instance according to the target editing operation, where the editing command is used to instruct the preview instance to perform the target editing operation on the preview scene of the preview instance;

a second editing unit configured to perform the target editing operation on the preview scene of the preview instance;

a preview unit configured to run dynamic content of the dynamic graphic in the preview scene on which the target editing operation has been performed, so that the editing instance outputs a preview image of the dynamic graphic.

In a seventh aspect, an embodiment of the present disclosure provides an electronic device, including a memory and a processor, wherein the memory stores a computer program, the processor, when executing the computer program, performs any dynamic graphic editing method as described above.

In an eighth aspect, an embodiment of the present disclosure provides a computer-readable storage medium storing a computer program thereon, and the computer program, when executed by the processor, causes implementation of any dynamic graphic editing method as described above.

In a ninth aspect, an embodiment of the present disclosure provides a computer program product including a computer program/instructions, which, when executed by a processor, causes implementation of any dynamic graphic editing method as described above.

In a tenth aspect, an embodiment of the present disclosure provides a computer program including program codes, which, when executed by a computer, cause the computer to implement any dynamic graphic editing method as described above.

In the dynamic graphic editing method provided by the embodiments of the present disclosure, a preview instance creates a preview scene which is the same as an editing scene of an editing instance, and upon receipt of an editing command sent from the editing instance which instructs the preview instance to perform a target editing operation including an editing operation performed by the editing instance on the editing scene on the preview scene, performs the target editing operation on the preview scene based on the editing command, and outputs a preview image of the dynamic graphic based on the preview scene on which the target editing operation has been performed and dynamic content of the dynamic graphic. Since the preview scene created in the preview instance is the same as an editing scene of an editing instance, and the editing operation performed by the preview instance on the preview scene is the same as the editing operation performed by the editing instance on the editing scene, and thus, the edited preview scene is the same as the editing scene, therefore, the dynamic graphic editing method provided by the embodiments of the present disclosure firstly can preview the edited dynamic graphic based on the preview instance, to meet the requirement of viewing the display effect after editing in real time. Furthermore, the preview instance can meet the requirement of viewing the display effect after editing, without needing to run dynamic content of the dynamic graphic in the editing instance, therefore, it can be avoided that the scene files are saved as the middle process of dynamic content so as to be modified by mistake during saving the editing result. The embodiments of the present disclosure can prevent the scene files of dynamic graphics from being saved as the middle process of dynamic content so as to be modified by mistake, while the display effect of the edited dynamic graphics can be viewed in real time.

DESCRIPTION OF THE DRAWINGS

The accompanying drawings, which are incorporated in and constitute a part of this specification, illustrate embodiments consistent with the disclosure and together with the description serve to explain the principles of the disclosure.

In order to more clearly illustrate the technical solutions in the embodiments of the present disclosure or the prior art, the following will briefly introduce the drawings that need to be used in the description of the embodiments or the prior art. Obviously, for those of ordinary skill in the art, other drawings can also be obtained from these drawings without creative labor.

DETAILED DESCRIPTION OF PREFERRED EMBODIMENTS

In order to more clearly understand the above objects, features and advantages of the present disclosure, the solution of the present disclosure will be further described below. It should be noted that the embodiments of the present disclosure and the features in the embodiments can be combined with each other without conflict.

In the following description, many specific details are set forth in order to fully understand the present disclosure, but the present disclosure can also be implemented in other ways than described here; obviously, the embodiments in the description are only some of the embodiments of the present disclosure, instead of all examples. The terms "first" and "second" and the like in the description and claims of the present disclosure are used to distinguish objects, instead of describing a specific order of objects. For example, a first malicious category and a second malicious category are used to distinguish different malicious categories, not for a specific order of malicious categories.

In the embodiments of the present disclosure, words such as "exemplary" or "for example" are used to indicate examples, illustrations or explications. Any embodiment or design scheme described as "exemplary" or "for example" in the embodiments of the present disclosure shall not be construed as being preferred or advantageous over other embodiments or design schemes. Exactly, the usage of words such as "exemplary" or "such as" is intended to present related concepts in a concrete manner. In addition, in the description of the embodiments of the present disclosure, unless otherwise specified, the meaning of "plurality" refers to two or more.

The scene architecture of the dynamic graphic editing method provided by an embodiment of the present disclosure will be described below firstly.

Figure 1:
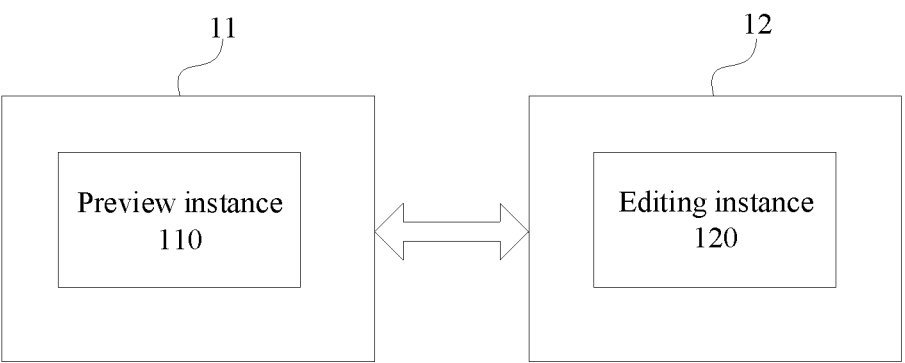
FIG. 1 is a first scene architecture schematic diagram of a dynamic graphic editing method provided by an embodiment of the present disclosure.

Referring to FIG. 1, a possible scene architecture of the dynamic graphic editing method provided by the embodiment of the present disclosure includes: a first dynamic graphic editing device 11 and a second dynamic graphic editing device 12. Wherein, a preview instance 110 for previewing dynamic graphics runs on the first dynamic graphic editing device 11, an editing instance 120 for editing dynamic graphics runs on the second dynamic graphic editing device 12, and a network connection is established between the first dynamic graphic editing device 11 and the second dynamic graphic editing device 12, and the preview instance 110 and the editing instance 120 perform data transmission through the network connection between the first dynamic graphic editing device 11 and the second dynamic graphic editing device 12.

Figure 2:
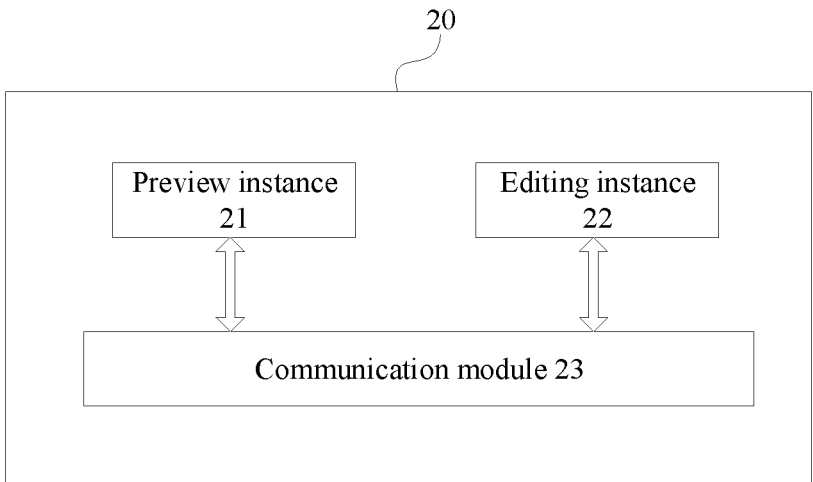
FIG. 2 is a second scene architecture schematic diagram of a dynamic graphic editing method provided by an embodiment of the present disclosure.

Referring to FIG. 2, another possible scene architecture of the dynamic graphic editing method provided by the embodiment of the present disclosure includes: a dynamic graphic editing device 20. Wherein, a preview instance 21 for previewing dynamic graphics, an editing instance 22 for editing dynamic graphics, and a communication module 23 run on the dynamic graphic editing device 20. Data transmission can be carried out between the preview instance 21 and the editing instance 22 through the communication module 23. Wherein, the communication module 23 may include a dynamic graphic editing device bus or a socket interface and the like.

Figure 3:
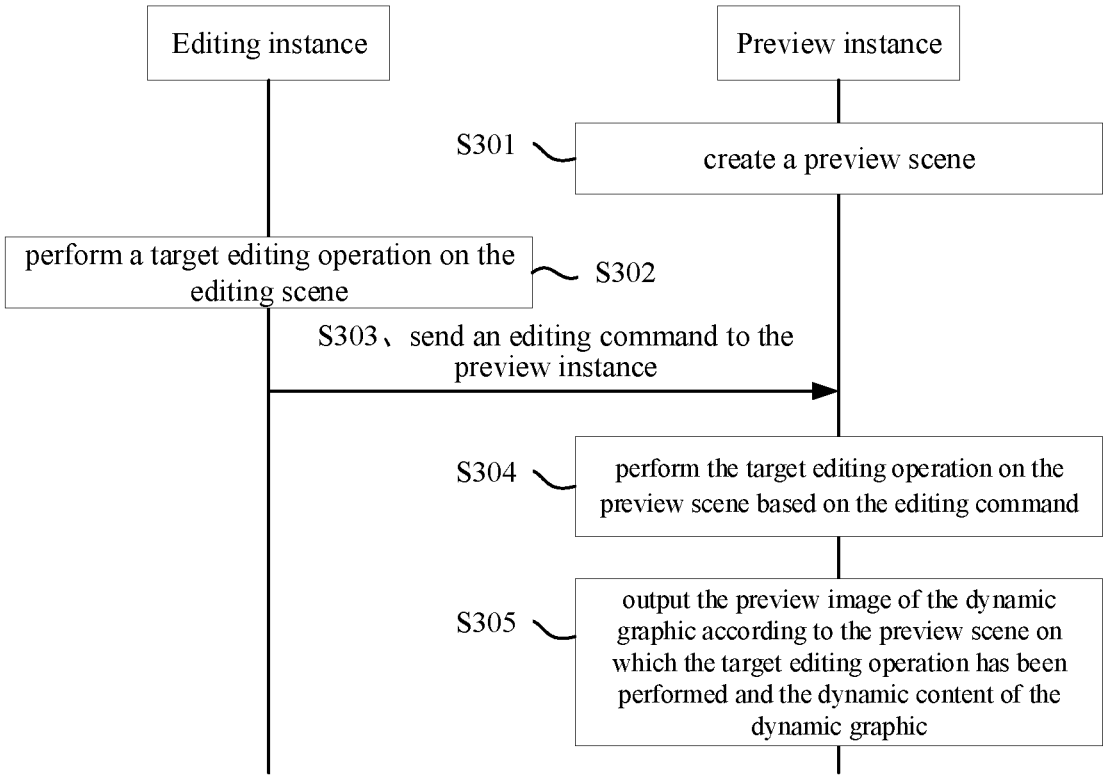
FIG. 3 is a first flow chart of steps of a dynamic graphic editing method provided by an embodiment of the present disclosure.

On the basis of the above content, the embodiment of the present disclosure provides a dynamic graphic editing method. Referring to FIG. 3, the dynamic graphic editing method provided by the embodiment of the disclosure includes the following steps:

S301. A preview instance creates a preview scene.

Wherein, the preview scene is the same as an editing scene of an editing instance.

That is, the preview instance creates a preview scene which is exactly the same as the editing scene of the editing instance. In addition, since the editing scene is a scene of the dynamic graphic to be edited, the preview scene is also the scene of the dynamic graphic to be edited.

S302. The editing instance performs a target editing operation on the editing scene.

The target editing operations in embodiments of the present disclosure may specifically include: an editing operation of creating an object in the editing scene, an editing operation of deleting an object from the editing scene, an editing operation of modifying an attribute value of an object in the editing scene, etc., the editing operations are not limited in the implementation of the present disclosure, and may include any one or more operations for editing the editing scene.

S303. The editing instance sends an editing command to the preview instance according to the target editing operation.

Correspondingly, the preview instance receives the editing command sent by the editing instance.

Wherein, the editing command is used to instruct the preview instance to perform the target editing operation on the preview scene of the preview instance.

For example, if the target editing operation includes an editing operation of adding object A into the editing scene, the editing command is used to instruct the preview instance to perform the editing operation of adding an object A into the preview scene.

Another example: the target editing operation includes an editing operation of modifying an attribute value of an attribute p of an object B to x in the editing scene, and the editing command is used to instruct the preview instance to perform the editing operation of modifying the attribute value of the attribute p of the object B to x in the editing scene.

Optionally, the implementation of the editing instance sending the editing command to the preview instance according to the target editing operation may include:

The editing instance generates an editing command according to the target editing operation;

The editing instance serializes the editing command to obtain the edit data;

The editing instance sends edit data to the preview instance.

Correspondingly, the implementation of the preview instance receiving the editing command sent by the editing instance may include:

The preview instance receives the edit data sent by the editing instance, and the edit data includes data obtained by serializing the editing command;

The preview instance deserializes the edit data to obtain the editing command.

That is, the editing command in the embodiment of the present disclosure is used to represent the editing operation performed by the editing instance on the editing scene. After the editing instance generates the editing command corresponding to the editing operation, it can first serialize the editing command into the edit data, and then send the edit data to the preview instance. After the preview instance receives the edit data, it deserializes the edit data into editing command.

In addition, different editing commands can be used for different editing operations. For example: when the editing operation is to create a specified type of object, an editing command of creating object can be utilized. As another example, when the editing operation is to set the attribute value of a specified attribute of a specified object to a specified value, an editing command of setting attributes can be utilized.

S304. The preview instance performs the target editing operation on the preview scene based on the editing command.

Since the preview scene created by the preview instance is the same as the editing scene of the editing instance, the editing operations performed by the preview instance on the preview scene are the same as those performed by the editing instance on the editing scene. The preview scene on which the target editing operation has been performed is still the same as the edited editing scene.

S305. The preview instance outputs the preview image of the dynamic graphic according to the preview scene on which the target editing operation has been performed and the dynamic content of the dynamic graphic.

Specifically, the dynamic graphic mainly includes two parts: one part is a scene file, and the other part is dynamic content. Among them, the scene file is used to define initial values of size, color, position and other attributes of the object in the dynamic graphic. The dynamic content refers to the components used to modify attributes of objects in the scene when the dynamic graphic are running, which mainly include: drive system, script, etc. During the dynamic graphic running, the dynamic content continuously modifies the attributes of objects in the scene to form a series of continuous images, and continuously displays these continuous images based on the principle of visual persistence to achieve smooth visual change effects. Since the preview scene on which the target editing operation has been modified is the same as the editing scene, a preview image of the dynamic graphic that is output according to the preview scene after performing the target editing operation and the dynamic content of the dynamic graphic is the preview image of the edited dynamic graphic image, so users can view the display effect of the edited dynamic graphic through the preview image of the dynamic graphic output by the preview instance.

It should be noted that after outputting the preview dynamic graphic, the user can also edit the edited scene again. If the user edits the edited scene again, the above steps S302 to S305 can be performed again until the user finishes the editing of the editing scene.

In the dynamic graphic editing method provided by the embodiments of the present disclosure, a preview instance creates a preview scene which is the same as an editing scene of an editing instance, and upon receipt of an editing command sent from the editing instance which instructs the preview instance to perform a target editing operation including an editing operation performed by the editing instance on the editing scene on the preview scene, performs the target editing operation on the preview scene based on the editing command, and outputs a preview image of the dynamic graphic based on the preview scene on which the target editing operation has been performed and dynamic content of the dynamic graphic. Since the preview scene created in the preview instance is the same as an editing scene of an editing instance, and the editing operation performed by the preview instance on the preview scene is the same as the editing operation performed by the editing instance on the editing scene, and thus, the edited preview scene is the same as the editing scene, therefore, the dynamic graphic editing method provided by the embodiments of the present disclosure firstly can preview the edited dynamic graphic based on the preview instance, to meet the requirement of viewing the display effect after editing in real time. Furthermore, the preview instance can meet the requirement of viewing the display effect after editing, without needing to run dynamic content of the dynamic graphic in the editing instance, therefore, it can be avoided that the scene files are saved as the middle process of dynamic content so as to be modified by mistake during saving the editing result. Therefore, the embodiments of the present disclosure can prevent the scene files of dynamic graphics from being saved as the middle process of dynamic content so as to be modified by mistake, while the display effect of the edited dynamic graphics can be viewed in real time.

It should also be noted that, compared with importing the dynamic graphics after editing into a preview instance for previewing, the above embodiment can improve the instantaneity of viewing the display effect after editing. Compared with importing the dynamic graphics into the preview instance for previewing in real time during the editing process, the above embodiment can prevent the dynamic graphics from being frequently imported and exported, thereby avoiding affecting the performance of the dynamic graphic editing device.

Figure 4:
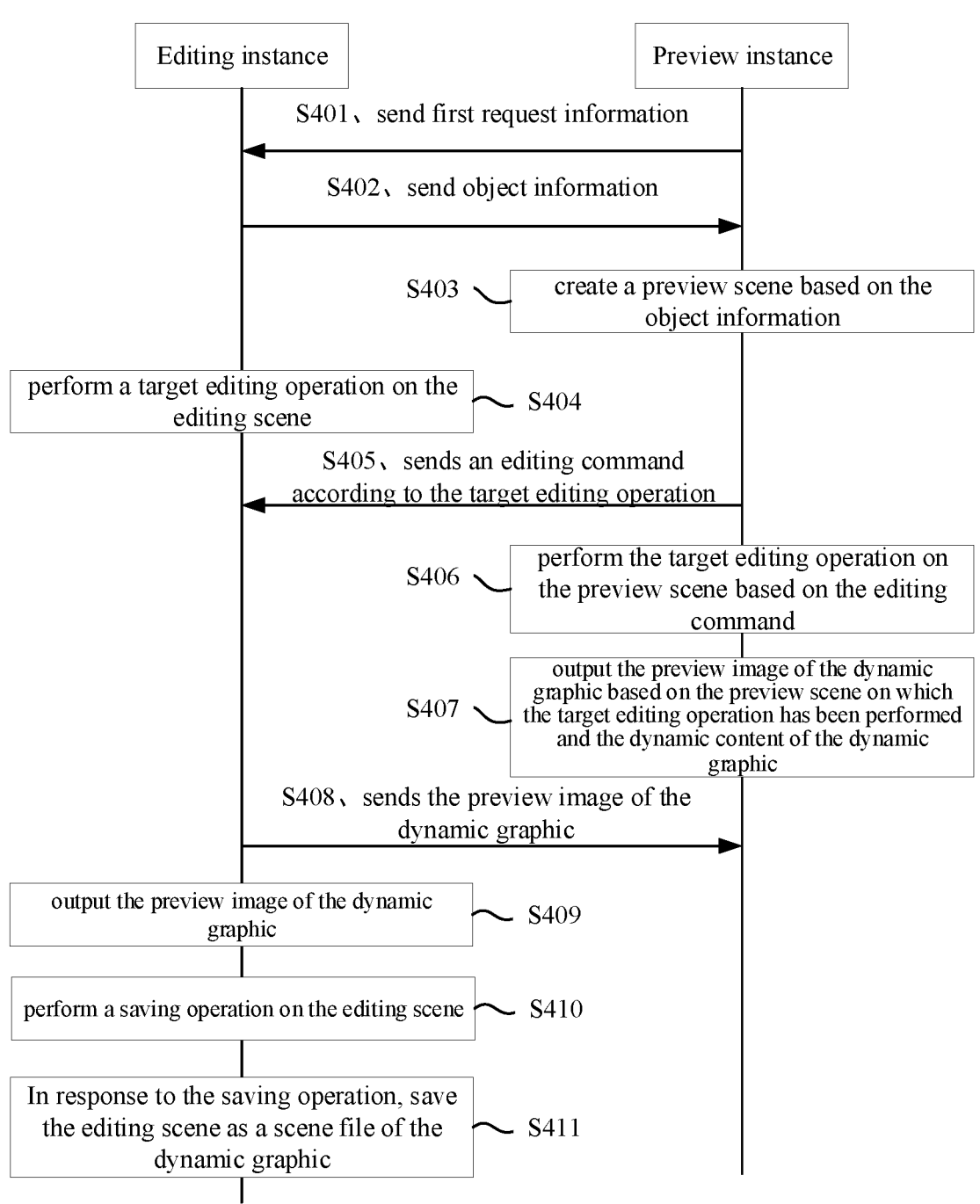
FIG. 4 is a second flow chart of steps of a dynamic graphic editing method provided by an embodiment of the present disclosure.

As extension and refinement of the dynamic graphic editing method provided in the above embodiments, the embodiment of the present disclosure provides another dynamic graphic editing method. Specifically, as shown in FIG. 4, the dynamic graphic editing method provided by the embodiment of the disclosure includes the following steps:

S401. A preview instance sends first request information to an editing instance. Correspondingly, the editing instance receives the first request information sent by the preview instance.

The first request information in the embodiment of the present disclosure is used for requesting to acquire information about an object in the editing scene. The object information includes each object in the editing scene, each attribute of each object, and an attribute value of each attribute.

S402. An editing instance sends object information to the preview instance according to the first request information.

Correspondingly, the preview instance receives the object information sent by the editing instance.

That is, the editing instance sends the attribute value of each attribute of each object in the editing scene to the preview instance.

Exemplarily, the object information may be shown in Table 1 below:

TABLE 1

| Object | Attribute | Attribute Value |
|---|---|---|
| Object A | Attribute a | x1 |
| | Attribute b | y1 |
| | Attribute c | z1 |
| | ⬦ | ⬦ |
| | ⬦ | ⬦ |
| Object B | Attribute a | x2 |
| | Attribute b | y2 |
| | Attribute c | z2 |
| | ⬦ | ⬦ |
| | ⬦ | ⬦ |
| ⬦ | ⬦ | ⬦ |
| ⬦ | ⬦ | ⬦ |

Optionally, the editing instance may send object information to the preview instance through a transport process (Transport). Among them, the transfer process is used to convert an object into one or more commands, and send the converted commands from the object to the preview instance. Wherein, the multiple commands obtained from the object conversion generally include an object creation command (Create Object) for instructing to create an object and multiple property setting commands (Set Property) for instructing to set property values of the object.

In addition, before the editing instance sends object information to the preview instance, the editing instance can also send an initialization command (Reset) to the preview instance to instruct to clear the objects in the preview scene, so that the preview instance can clear the objects in the preview scene according to the initialization command, and recreate the preview scene based on the object information sent by the editing instance.

S403. The preview instance creates a preview scene according to the object information.

Since the object information includes each object in the editing scene, each attribute of each object, and an attribute value of each attribute, the preview scene created according to the object information is the same as the editing scene.

S404. The editing instance performs a target editing operation on the editing scene.

S405. The editing instance sends an editing command to the preview instance according to the target editing operation.

Correspondingly, the preview instance receives the editing command sent by the editing instance.

Wherein, the editing command is used to instruct the preview instance to perform the target editing operation on the preview scene of the preview instance.

S406. The preview instance performs the target editing operation on the preview scene based on the editing command.

S407. The preview instance outputs the preview image of the dynamic graphic based on the preview scene on which the target editing operation has been performed and the dynamic content of the dynamic graphic.

The above steps S404 to S407 can be implemented in the same way as the steps S302 to S305 respectively, and the analysis and description of steps S404 to S407 will not be repeated here.

Similarly, if the editing instance executes editing operations on the editing scene for multiple times, the above steps S404 to S407 are performed multiple times, until no editing operation is performed on the editing scene.

S408. The preview instance sends the preview image of the dynamic graphic to the editing instance.

Correspondingly, the editing instance receives the preview image of the dynamic graphic sent by the preview instance.

Wherein, the preview image is generated according to the preview scene on which the target editing operation has been performed and the dynamic content of the dynamic graphic.

S409. The editing instance outputs the preview image of the dynamic graphic.

S410. The editing instance performs a save operation on the editing scene.

S411. In response to the save operation, save the editing scene on which the target editing operation has been performed as a scene file of the dynamic graphic.

As an optional implementation of the embodiment of the present disclosure, the dynamic graphic editing method provided by the embodiment of the present disclosure further includes the following steps a to c:

Step a, the preview instance sends second request information to the editing instance.

Correspondingly, the editing instance receives the second request information sent by the preview instance.

Wherein, the second request information carries an identifier of a target dynamic graphic.

Step b. The editing instance sends a response message to the preview instance.

Correspondingly, the preview instance receives the response information sent by the editing instance.

Wherein, the response information includes the scene file of the target dynamic graphic and the dynamic content of the target dynamic graphic.

Step c, outputting a preview image of the target dynamic graphic based on the scene file of the target dynamic graphic and the dynamic content of the target dynamic graphic.

An application scenario of the above embodiment is that: before editing the dynamic graphic, firstly check the display effect of the dynamic graphic to determine whether the dynamic graphic need to be edited. In this application scenario, the above steps a to c are performed before the above step S401 (the preview instance sends the first request information to the editing instance).

Another application scenario of the above embodiment is that: the user checks the display effect of the dynamic graphic generated by the editing instance to confirm whether the display effect of the dynamic graphic generated by the editing instance is the same as the preview dynamic graphic output by the preview instance. In this application scenario, the above steps a to c are executed after the above step S411 (the editing instance saves the editing scene).

Optionally, the preview scene of the preview instance includes at least one object, each object includes a Globally Unique Identifier (GUID), and is mapped to a corresponding object in the editing scene through the GUID.

Correspondingly, the editing scene of the editing instance includes at least one object, each object includes a globally unique identifier GUID, and is mapped to a corresponding object in the preview scene through the GUID.

As an optional implementation of this embodiment of the present disclosure, the target editing operation includes an operation of modifying the target attribute value of the target object to the first attribute value; correspondingly, the editing command includes: a first identifier of the target object used to identify the target object, the second identifier used to identify the target attribute, and the first attribute value.

For example, if the target editing operation is to change the attribute value of the attribute p of the object A in the editing scene to x, the editing command includes the identifier of the object A, the identifier of the attribute p, and the attribute value x.

Exemplarily, the first identifier may be the GUID of the object.

As an optional implementation of the embodiment of the present disclosure, data transmission between the preview instance and the edit instance is performed via a socket interface.

Because in the scene architecture shown in FIG. 1 (the preview instance and the editing instance run on different physical devices) and in the scene architecture shown in FIG. 2 (the preview instance and the editing instance run on the same physical device), the data transmission between the preview instance and the editing instance can be carried out through the socket interface, so setting the data transmission between the preview instance and the editing instance through the socket interface can unify program codes for realizing the preview instance and the editing instance in each scene architecture, thereby reducing the development workload.

An embodiment of the present disclosure also provides another dynamic graphic editing method, which includes:

creating a preview scene of a preview instance which is the same as an editing scene of an editing instance;

performing a target editing operation on the editing scene of the editing instance;

sending an editing command to the preview instance according to the target editing operation, where the editing command is used to instruct the preview instance to perform the target editing operation on the preview scene of the preview instance;

performing the target editing operation on the preview scene of the preview instance;

running dynamic content of the dynamic graphic in the preview scene on which the target editing operation has been performed, so that the editing instance outputs a preview image of the dynamic graphic.

The dynamic graphic editing method provided by the above-mentioned embodiment can achieve technical effects which are similar to the technical effect achieved by the dynamic graphic editing method shown in FIG. 3, and will not be repeated here.

Based on the same inventive concept, as an implementation of the above method, the embodiment of the present disclosure also provides a dynamic graphic editing device, the device embodiment corresponds to the aforementioned method embodiment, for the convenience of reading, the details in the aforementioned method embodiment will not be repeated in the present device embodiment one by one, but it should be noted that the dynamic graphic editing device in this embodiment can correspondingly implement all contents in the foregoing method embodiments.

Figure 5:
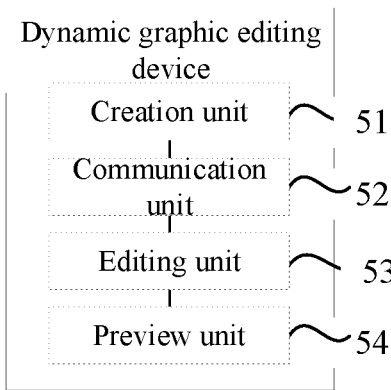
FIG. 5 is a first schematic diagram of a dynamic graphic editing device provided by an embodiment of the present disclosure.

An embodiment of the present disclosure provides a dynamic graphic editing device on which a preview instance runs. FIG. 5 is a schematic structural diagram of the dynamic graphic editing device, as shown in FIG. 5, the dynamic graphic editing device 500 includes:

a creation unit 51 configured to create a preview scene which is the same as an editing scene of an editing instance, a communication unit 52 configured to receive an editing command sent by the editing instance which instructs the preview instance to perform a target editing operation on the preview scene, and wherein the target editing operation includes an editing operation performed by the editing instance on the editing scene, an editing unit 53 configured to perform the target editing operation on the preview scene based on the editing command, and a preview unit 54 configured to output a preview image of the dynamic graphic based on the preview scene on which the target editing operation has been performed and the dynamic graphic.

As an optional implementation of the embodiment of the present disclosure, the creation unit 51 is configured to send first request information to the editing instance, receive object information sent by the editing instance, the object information including each object in the editing scene, each attribute of each object, and an attribute value of each attribute, and create the preview scene based on the object information.

As an optional implementation of the embodiment of the present disclosure, the preview scene of the preview instance includes at least one object, each object includes a globally unique identifier GUID, and is mapped to a corresponding object in the editing scene through the GUID.

As an optional implementation of the embodiment of the present disclosure, the target editing operation includes an operation of modifying a target attribute value of the target object to a first attribute value, The editing command includes: a first identifier of the target object, a second identifier for identifying the target attribute, and the first attribute value.

As an optional implementation of the embodiment of the present disclosure, the communication unit 52 is configured to receive edit data sent by the editing instance, where the edit data includes data obtained by serializing the editing command, deserialize the edit data to obtain the editing command.

As an optional implementation of the embodiment of the present disclosure, the communication unit 52 is configured to receive the edit data sent by the editing instance via a socket interface.

As an optional implementation of the embodiment of the present disclosure, the communication unit 52 is configured to, after the target editing operation is performed on the preview scene based on the editing command, send a preview image of the dynamic graphic to the editing instance.

As an optional implementation of the embodiment of the present disclosure, the communication unit 52 is further configured to send second request information to the editing instance, where the second request information carries an identifier of the target dynamic graphic, receive response information sent by the editing instance, the response information including a scene file of the target dynamic graphic and the dynamic content of the target dynamic graphic, the preview unit 54 is further configured to output the preview image of the target dynamic graphic based on the scene file of the target dynamic graphic and the dynamic content of the target dynamic graphic.

Figure 6:
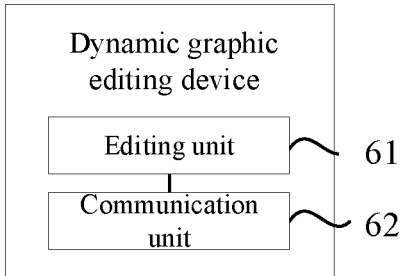
FIG. 6 is a second schematic diagram of a dynamic graphic editing device provided by an embodiment of the present disclosure.

The embodiment of the present disclosure also provides another dynamic graphic editing device on which an editing instance runs. FIG. 6 is a schematic structural diagram of the dynamic graphic editing device. As shown in FIG. 6, the dynamic graphic editing device 600 includes:

an editing unit 61 configured to perform a target editing operation on an editing scene;

a communication unit 62 configured to send an editing command to a preview instance according to the target editing operation, wherein the editing command is used to instruct the preview instance to perform the target editing operation on a preview scene of the preview instance.

As an optional implementation of the embodiment of the present disclosure, the communication unit 62 is further configured to, before sending the editing command to the preview instance, receive first request information sent by the preview instance, send object information to the preview instance according to the first request information, wherein, the object information including each object in the editing scene, each attribute of each object, and an attribute value of each attribute.

As an optional implementation of the embodiment of the present disclosure, the editing scene of the editing instance includes at least one object, each object includes a globally unique identifier GUID, and is mapped to a corresponding object in the editing scene through the GUID.

As an optional implementation of this embodiment of the present disclosure, the editing unit 61 is further configured to, after performing the target editing operation on the editing scene, perform a save operation on the editing scene, and in response to the save operation, save the editing scene on which the target editing operation has been performed as a scene file of the dynamic graphic.

As an optional implementation of the embodiment of the present disclosure, the communication unit 61 is further configured to receive a preview image of the dynamic graphic sent from the preview instance, output the preview image of the dynamic graphic.

Wherein the preview image is generated based on the preview scene on which the target editing operation has been performed and the dynamic content of the dynamic graphic.

As an optional implementation of the embodiment of the present disclosure, the communication unit 61 is further configured to receive second request information sent by the preview instance, the second request information carrying an identifier of the target dynamic graphic, and send response information to the editing instance according to the second request information, the response information including a scene file of the target dynamic graphic and the dynamic content of the target dynamic graphic.

Figure 7:
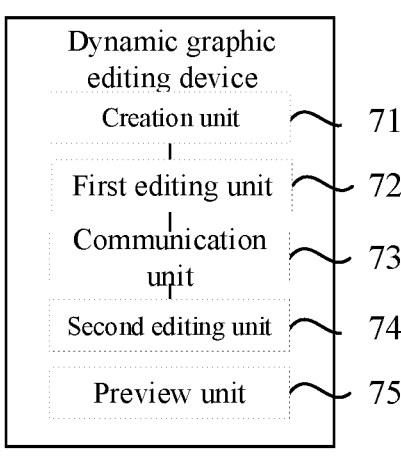
FIG. 7 is a third schematic diagram of a dynamic graphic editing device provided by an embodiment of the present disclosure.

The embodiment of the present disclosure also provides another dynamic graphic editing device on which a preview instance runs, referring to FIG. 7, the dynamic graphic editing device 700 includes:

a creation unit 71 configured to create a preview scene of the preview instance which is the same as an editing scene of an editing instance;

a first editing unit 72 configured to perform a target editing operation on the editing scene of the editing instance;

a communication unit 73 configured to send an editing command to the preview instance according to the target editing operation, where the editing command is used to instruct the preview instance to perform the target editing operation on the preview scene of the preview instance;

a second editing unit 74 configured to perform the target editing operation on the preview scene of the preview instance;

a preview unit 75 configured to run dynamic content of the dynamic graphic in the preview scene on which the target editing operation has been performed, so that the editing instance outputs a preview image of the dynamic graphic.

Figure 8:
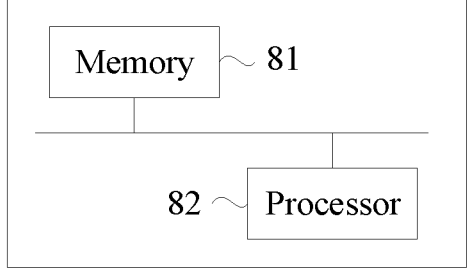
FIG. 8 is a schematic diagram of a hardware structure of an electronic device provided by an embodiment of the present disclosure.

Based on the same inventive concept, an embodiment of the present disclosure also provides an electronic device. FIG. 8 is a schematic structural diagram of an electronic device provided by an embodiment of the present disclosure, as shown in FIG. 8, the electronic device provided by the embodiment includes: a memory 81 and a processor 82, the memory 81 is used to store a computer program; the processor 82 is used to perform the steps of the dynamic graphic editing method provided by any one of the above embodiments are executed when invoking the computer program.

An embodiment of the present disclosure also provides a computer-readable storage medium, on which a computer program is stored, and the computer program, when executed by a processor, causes implementation of the steps of the dynamic graphic editing method provided by any one of the above-mentioned embodiments.

An embodiment of the present disclosure further provides a computer program product, including a computer program/instructions, which, when executed by a processor, cause implementation of the steps of the dynamic graphic editing method provided by any one of the above-mentioned embodiments.

An embodiment of the present disclosure further provides a computer program, program codes included in the computer program, when executed by a computer, causing the computer to implement the dynamic graphic editing method provided by any one of the above embodiments.

Those skilled in the art should understand that the embodiments of the present disclosure may be provided as methods, systems, or computer program products. Accordingly, the present disclosure can take the form of an entirely hardware embodiment, an entirely software embodiment, or an embodiment combining software and hardware aspects. Furthermore, the present disclosure may take the form of computer program products implemented on one or more computer-usable storage media having computer-usable program codes embodied therein.

The processor can be a Central Processing Unit (CPU), or other general-purpose processors, Digital Signal Processor (DSP), Application Specific Integrated Circuit (ASIC), Field-Programmable Gate Array (FPGA) or other programmable logic devices, discrete gate, or transistor logic devices, discrete hardware components, etc. A general-purpose processor may be a microprocessor, or the processor may be any conventional processor, and the like.

Memory may be in the form of a non-permanent storage, random access memory (RAM) and/or nonvolatile memory such as read only memory (ROM) or flash RAM, in a computer readable medium. The memory is an example of a computer readable medium.

Computer-readable media includes both volatile and non-volatile, removable and non-removable storage media. The storage medium may store information by any method or technology, and the information may be computer-readable instructions, data structures, program modules, or other data. Examples of computer storage media include, but not limited to, phase change memory (PRAM), static random access memory (SRAM), dynamic random access memory (DRAM), other types of random access memory (RAM), read only memory (ROM), Electrically Erasable Programmable Read-Only Memory (EEPROM), Flash memory or other memory technology, Compact Disc Read-Only Memory (CD-ROM), Digital Versatile Disc (DVD) or other optical storage, a magnetic tape cartridge, disk storage or other magnetic storage device or any other non-transmission medium that can be used to store information that can be accessed by a computing device. As defined herein, computer-readable media exclude transitory computer-readable media, such as modulated data signals and carrier waves.

Finally, it should be noted that: the above embodiments are only used to illustrate the technical solutions of the present disclosure, instead of limiting them; although the present disclosure has been described in detail with reference to the foregoing embodiments, those of ordinary skill in the art should understand that: it is still possible to modify the technical solutions described in the foregoing embodiments, or perform equivalent replacements for some or all of the technical features; and these modifications or replacements do not make the essence of the corresponding technical solutions deviate from the scopes of technical solutions of the various embodiments of the present disclosure.

What is claimed is:

1. A dynamic graphic editing method, the method is applied to a preview instance, the method comprises:
  creating a preview scene, the preview scene is equivalent to an editing scene of an editing instance,
  receiving an editing command sent by the editing instance, the editing command is configured to instruct the preview instance to perform a target editing operation on the preview scene, and wherein the target editing operation comprises an editing operation performed by the editing instance on the editing scene,
  performing the target editing operation on the preview scene based on the editing command, and
  outputting a preview image of a dynamic graphic based on the preview scene, on which the target editing operation has been performed, and dynamic content of the dynamic graphic.

2. The method of claim 1, wherein the creating a preview scene comprises:
  sending first request information to the editing instance,
  receiving object information sent by the editing instance, the object information comprising each object in the editing scene, each attribute of each object, and an attribute value of each attribute, and
  creating the preview scene based on the object information.

3. The method of claim 1, wherein the preview scene of the preview instance comprises at least one object, each object comprises a globally unique identifier, GUID, and is mapped to a corresponding object in the editing scene through the GUID, or
  wherein the target editing operation comprises an operation of modifying a target attribute value of the target object to a first attribute value, or
  wherein the editing command comprises: a first identifier of the target object, a second identifier for identifying the target attribute, and the first attribute value.

4. The method of claim 1, wherein the receiving the editing command sent by the editing instance comprises:
  receiving edit data sent by the editing instance, wherein the edit data comprises data obtained by serializing the editing command, and
  deserializing the edit data to obtain the editing command.

5. The method of claim 4, wherein the receiving the edit data sent by the editing instance comprises:
  receiving the edit data sent by the editing instance via a socket interface.

6. The method of claim 1, wherein the method further comprises, after performing the target editing operation on the preview scene based on the editing command,
  sending a preview image of the dynamic graphic to the editing instance.

7. The method of claim 1, wherein the method further comprises:
  sending second request information to the editing instance, where the second request information carries an identifier of a target dynamic graphic,
  receiving response information sent by the editing instance, the response information comprising a scene file of the target dynamic graphic and the dynamic content of the target dynamic graphic, and
  outputting the preview image of the target dynamic graphic based on the scene file of the target dynamic graphic and the dynamic content of the target dynamic graphic.

8. An electronic device, comprising: a processor and a memory, wherein the memory stores a computer program, the processor, when invoking the computer program, executes operations comprising:
  creating a preview scene, the preview scene is equivalent to an editing scene of an editing instance,
  receiving an editing command sent by the editing instance, the editing command instructs the preview instance to perform a target editing operation on the preview scene, and wherein the target editing operation comprises an editing operation performed by the editing instance on the editing scene,
  performing the target editing operation on the preview scene based on the editing command, and
  outputting a preview image of a dynamic graphic based on the preview scene, on which the target editing operation has been performed, and dynamic content of the dynamic graphic.

9. The electronic device of claim 8, wherein the creating a preview scene comprises:
  sending first request information to the editing instance,
  receiving object information sent by the editing instance, the object information comprising each object in the editing scene, each attribute of each object, and an attribute value of each attribute, and
  creating the preview scene based on the object information.

10. The electronic device of claim 8, wherein the receiving the editing command sent by the editing instance comprises:
  receiving edit data sent by the editing instance, where the edit data comprises, data obtained by serializing the editing command, and
  deserializing the edit data to obtain the editing command.

11. The electronic device of claim 10, wherein the receiving the edit data sent by the editing instance comprises:
  receiving the edit data sent by the editing instance via a socket interface.

12. The electronic device of claim 8, wherein the processor, when invoking the computer program, executes further operations comprising:

after performing the target editing operation on the preview scene based on the editing command, sending a preview image of the dynamic graphic to the editing instance.

13. The electronic device of claim 8, wherein the processor, when invoking the computer program, executes further operations comprising:

sending second request information to the editing instance, where the second request information carries an identifier of a target dynamic graphic, receiving response information sent by the editing instance, the response information comprising a scene file of the target dynamic graphic and the dynamic content of the target dynamic graphic, and outputting the preview image of the target dynamic graphic based on the scene file of the target dynamic graphic and the dynamic content of the target dynamic graphic.

14. A non-statutory computer-readable storage medium storing a computer program thereon, wherein the computer program, when executed by a processor, causes implementing operations comprising:

creating a preview scene, the preview scene is equivalent to an editing scene of an editing instance, receiving an editing command sent by the editing instance, the editing command instructs the preview instance to perform a target editing operation on the preview scene, and wherein the target editing operation comprises an editing operation performed by the editing instance on the editing scene, performing the target editing operation on the preview scene based on the editing command, and outputting a preview image of a dynamic graphic based on the preview scene, on which the target editing operation has been performed, and dynamic content of the dynamic graphic.

15. The non-statutory computer-readable storage medium of claim 14, wherein the creating a preview scene comprises:

sending first request information to the editing instance, receiving object information sent by the editing instance, the object information comprising each object in the editing scene, each attribute of each object, and an attribute value of each attribute, and creating the preview scene based on the object information.

16. The non-statutory computer-readable storage medium of claim 14, wherein the receiving the editing command sent by the editing instance comprises:

receiving edit data sent by the editing instance, where the edit data comprises, data obtained by serializing the editing command, and deserializing the edit data to obtain the editing command.

17. The non-statutory computer-readable storage medium of claim 16, wherein the receiving the edit data sent by the editing instance comprises:

receiving the edit data sent by the editing instance via a socket interface.

18. The non-statutory computer-readable storage medium of claim 14, wherein the computer program, when executed by a processor, causes implementing further operations comprising:

after performing the target editing operation on the preview scene based on the editing command, sending a preview image of the dynamic graphic to the editing instance.

19. The non-statutory computer-readable storage medium of claim 14, wherein the computer program, when executed by a processor, causes implementing further operations comprising:

sending second request information to the editing instance, where the second request information carries an identifier of a target dynamic graphic, receiving response information sent by the editing instance, the response information comprising a scene file of the target dynamic graphic and the dynamic content of the target dynamic graphic, and outputting the preview image of the target dynamic graphic based on the scene file of the target dynamic graphic and the dynamic content of the target dynamic graphic.

* * * * *